May 6, 1930.                    E. POTAUFEUX                    1,757,216
                                PORTABLE CONVEYER
                        Filed July 28, 1928         2 Sheets-Sheet 1
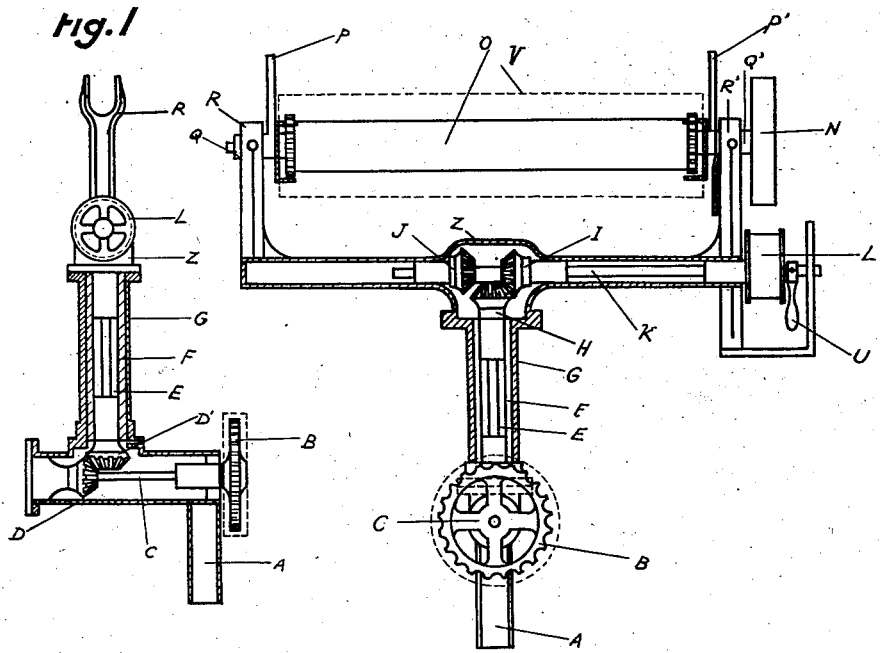
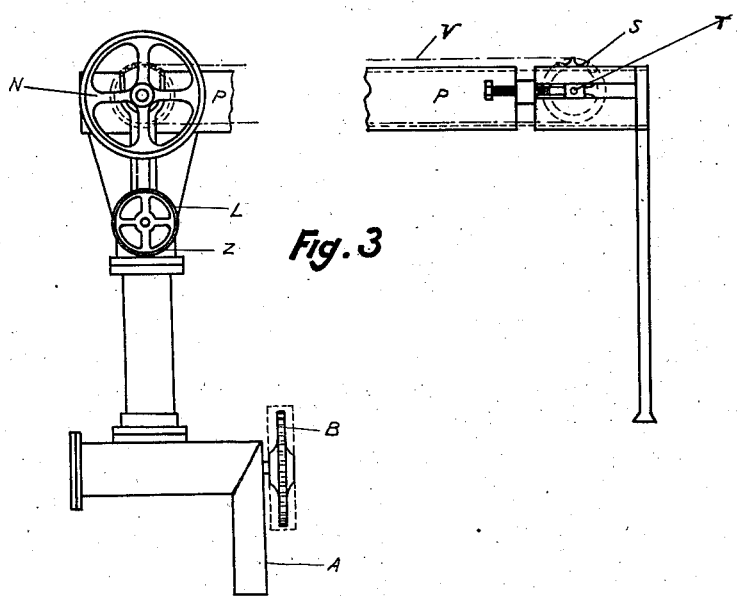
Witnesses:
Inventor:
Emile Potaufeux
per Fred F. Barlow
    Attorney

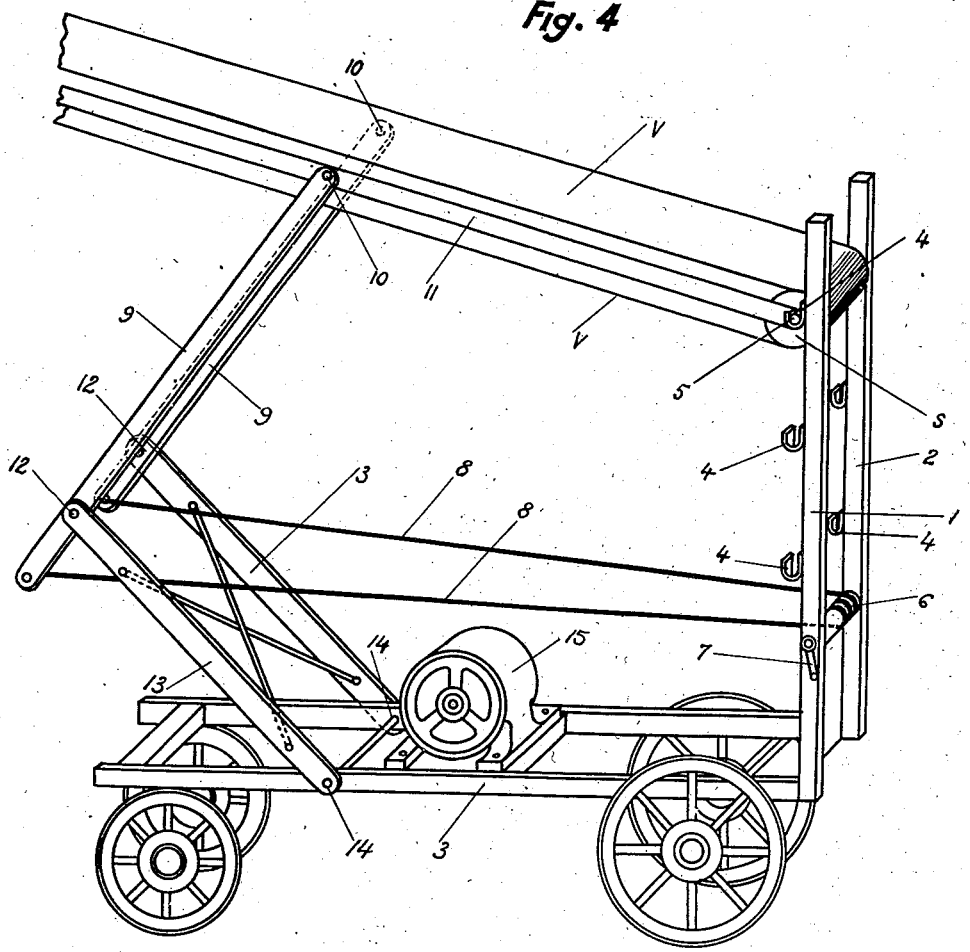

Patented May 6, 1930

1,757,216

UNITED STATES PATENT OFFICE

EMILE POTAUFEUX, OF CORMICY, FRANCE

PORTABLE CONVEYER

Application filed July 28, 1928, Serial No. 296,049, and in France August 2, 1927.

My invention relates to a conveyer of the portable type and the object of the invention is to provide a conveyer which shall be particularly suitable for feeding bundles to thrashing machines or for unloading hay or straw.

Other more specific objects of the invention will be obvious to those skilled in the art in the following description taken in connection with the accompanying drawing forming part of this specification and in which—

Fig. 1 is a lateral section through the support;

Fig. 2 is a side view thereof, partly in section;

Fig. 3 is a lateral view of the conveyer, and

Fig. 4 is a view of the conveyer mounted on a carriage.

Referring to Figs. 1 and 2, the conveyer comprises a support furnished with two lateral arms having the shape of a fork and destined to support at one of its extremities an endless belt acting as a conveyer belt.

Said endless belt shown at V is actuated by means of a driving wheel B in turn driven by means of a chain and a motor. Movement is transmitted by a horizontal shaft C to a bevelled gear D which meshes with a second bevelled gear D' fixed to a vertical shaft E at the extremity of which is fixed a bevelled gear H (Fig. 2) meshing with a second pinion I fixed on a horizontal shaft K carrying an operating pulley L.

Said pulley L operates a pulley N secured to a roller O destined to drive the endless belt V placed between the inner edges of a pair of supporting members P and P'.

The driving elements are placed in a cylindrical casing Z of strong sheet metal. The fork support is adapted to pivot and take any desired position with respect to a horizontal plane. The mounting column is composed of two concentric tubes F and G. The larger G is fixed to the support and is movable on its base whereas the other F fixed to the base is stationary. The said two tubes telescope one within the other.

Brackets R and R' of the support terminate in a fork and receive trunnions Q and Q' of the roller.

The conveyer is composed of an endless belt V (Fig. 3), provided with the usual rods (not shown) and driven by the roller O which operates from the pulley N. Said belt is tightened by a roller stretcher S placed at the other extremity and supported by one or more supporting rollers (not shown).

The direction of movement of the endless belt can be reversed by bringing the pinion J (Fig. 2) in mesh with pinion H while the pinion I becomes disengaged by displacing the arbor K about three centimeters to the right. In this position an operating handle U which was in the extreme left hand position is moved to the extreme right hand position.

The endless band moving with the forks R along a horizontal plane, is also movable in the vertical plane about the trunnions Q and Q' of roller O and its free extremity may be elevated above or lowered below the supporting level of said forks.

The apparatus is secured to a thrashing machine, for example, by means of an attaching prong A (Fig. 1).

My apparatus may be mounted in less than ten minutes and during operation only one workman is sufficient for shifting the extremity of the apron for raising and lowering it.

The apron may be lengthened or shortened if desired by means of connecting parts (not shown) of length and number corresponding to the work to be accomplished.

My light conveyer is easily handled and is suitable for use in loading, unloading, thrashing of grains and stacking bundles, hay and the like.

Figure 4 shows the conveyer mounted on a carriage or truck.

The stretching roller S around which passes the endless belt V is hooked on uprights 1 and 2 which are mounted at the rear of a truck 3. The said uprights are provided with a series of hooks 4 placed at different heights and destined to receive the extremities 5 of the arbor of roller S. On this pair of uprights is mounted a drum 6 with a crank 7 about which are wound cables 8 fixed to the extremities of levers 9 adapted to pivot on studs 10 fixed to the lateral cheeks 11 of the conveyer. Said levers 9 are pivoted at 12 on the arms 13 in turn pivoted on trunnions 14 of the frame of truck 3. Thus the apron of the conveyer may be easily raised and lowered whose extremity is fixed on supports having the form of a fork as illustrated in Figs. 1 and 2.

A small motor 15 is provided for operating the conveyer by means of a belt, (not shown) which passes over the drive wheel B, in this case a pulley, which, as before stated, occupies a fixed position on the thrashing machine.

While I have described what I deem to be the preferable form of my device I do not wish to be limited thereto as there might be changes made in the arrangements of parts as well as their construction without departing from the spirit of the invention as comprehended within the scope of the appended claims.

Having described my invention what I claim as new and desire to secure by Letters Patent of the United States is:

1. A conveyer of the type described comprising, a pivotally mounted conveyer belt, a pair of uprights adjacent the free end of said conveyer belt, a plurality of pairs of hooks on said upright adapted to receive the free end of said belt and a toggle for raising and lowering said belt.

2. A conveyer of the type described comprising, a pivotally mounted conveyer belt, a pair of uprights adjacent the free end of said conveyer belt, a plurality of pairs of hooks on said upright adapted to receive the free end of said belt, a toggle for raising and lowering said belt, a plurality of cables attached to said toggle and a windlass for winding up said cables.

3. A conveyer of the type described comprising, a pivotally mounted conveyer belt, a pair of uprights adjacent the free end of said conveyer belt, a plurality of pairs of hooks on said upright adapted to receive the free end of said belt, a pair of levers pivoted at their extremity associated with said conveyer belt, a lever pivoted to each of said first mentioned levers adjacent the extremity thereof, means for pivoting the other extremity of said last mentioned levers, a cable attached to the free extremity of each of said first mentioned levers and means for winding up said cables.

4. A conveyer of the type described comprising, a pivotally mounted frame a guide roller in said frame, a pair of uprights adjacent the free end of said frame, a plurality of pairs of hooks on said uprights adapted to receive the free end of said frame, a toggle for raising and lowering said frame and an endless belt passing over said guide roller.

5. A conveyer of the type described comprising, a pivotally mounted conveyer belt, a truck for said conveyer belt, a pair of uprights adjacent the free end of said conveyer belt on said truck, a plurality of pairs of hooks on said upright adapted to receive the free end of said belt, a toggle for raising and lowering said belt carried by said truck, a plurality of cables attached to said toggle and a windlass carried by said uprights for winding up said cables.

In testimony whereof I hereunto affix my signature.

EMILE POTAUFEUX.